United States Patent [19]
Wataya

[11] Patent Number: 6,080,485
[45] Date of Patent: Jun. 27, 2000

[54] YTTRIUM OXIDE-ALUMINUM OXIDE COMPOSITE PARTICLES AND METHOD FOR THE PREPARATION THEREOF

[75] Inventor: Kazuhiro Wataya, Fukui-ken, Japan

[73] Assignee: Shin-Etsu Chemical Co., Ltd., Japan

[21] Appl. No.: 09/102,626

[22] Filed: Jun. 23, 1998

[30] Foreign Application Priority Data

Jul. 2, 1997 [JP] Japan ..................................... 9-176843

[51] Int. Cl.$^7$ ........................... B32B 15/02; B32B 17/02; B32B 19/00; B32B 21/02
[52] U.S. Cl. ....................... 428/403; 428/404; 428/411.1; 428/688; 428/701
[58] Field of Search .................................... 428/403, 404, 428/688, 701, 411.1

[56] References Cited

U.S. PATENT DOCUMENTS

| | | | |
|---|---|---|---|
| 4,851,293 | 7/1989 | Egerton et al. | 428/403 |
| 5,320,675 | 6/1994 | Dransfiels et al. | 106/450 |
| 5,415,775 | 5/1995 | Castillon et al. | 210/490 |
| 5,633,084 | 5/1997 | Hiraiwa et al. | 428/403 |

OTHER PUBLICATIONS

J. Daniel et al., *Ceramic Transactions*, 46, 913–924 (1994).
A. Garg et al., *J. Mater. Res.*, 5(1), 136–142 (1990).

*Primary Examiner*—William Krynski
*Assistant Examiner*—B. Shewareged
*Attorney, Agent, or Firm*—Wenderoth, Lind & Ponack, L.L.P.

[57] ABSTRACT

Provided by the invention is a powder of alumina-yttria composite particles of which each particle has a structure consisting of a core of alumina and cladding layer of yttria. By virtue of the microscopically intimate and uniform mixing condition of the two oxide components, the powder is useful as a base material of sintered ceramic bodies or as an ingredient in a protective film on fluorescent lamps. The composite particles are prepared by a process comprising the steps of: suspending alumina particles in an aqueous solution containing a water-soluble yttrium salt such as nitrate; dissolving urea in the aqueous suspension; heating the suspension at an elevated temperature to effect hydrolysis of urea into ammonia and carbon dioxide forming a layer of yttrium basic carbonate on the alumina particles; and calcining the basic carbonate-clad particles of alumina at a specified temperature to convert the basic carbonate of yttrium into yttrium oxide.

1 Claim, No Drawings

YTTRIUM OXIDE-ALUMINUM OXIDE COMPOSITE PARTICLES AND METHOD FOR THE PREPARATION THEREOF

BACKGROUND OF THE INVENTION

The present invention relates to yttrium oxide-aluminum oxide composite particles and a method for the preparation thereof. More particularly, the invention relates to novel fine composite particles each consisting of a core particle of aluminum oxide and a cladding layer of yttrium oxide on the core particle as well as to an efficient method for the preparation of such composite particles. The composite particles are useful as a base material in the preparation of a sintered ceramic body consisting of yttrium oxide and aluminum oxide and as an ingredient in the protective film over the glass surface of a fluorescent lamp.

Sintered bodies consisting of yttrium oxide, i.e. yttria, and aluminum oxide, i.e. alumina, are widely utilized in the ignition tubes for sodium lamps and metal halide lamps and as a base material in the preparation of YAG (yttrium aluminum garnet) crystals. Such a sintered body is prepared usually by subjecting a powder blend consisting of a yttrium oxide powder having an average particle diameter of 1 µm and an aluminum oxide powder having an average particle diameter in the submicron range to a sintering treatment in vacuum or in an atmosphere of air. As an inherent problem in the powder blending process involved in this preparation, the particles of the respective oxides can never be in a very intimately and uniformly mixed condition so that the powder blend is more or less microscopically not uniform from portion to portion.

It is an established technology that the glass surface of various kinds of lamps such as fluorescent lamps is provided with a coating layer of alumina as a protective film which has an effect of improving the durability and luminescent efficiency of the lamp while it is pointed out as an idea that replacement of the alumina in this application with another metal oxide such as yttrium oxide could be more efficient in respect of the above mentioned improvements. Despite this idea, fine particles consisting of or containing yttrium oxide as one of the principal constituents and suitable for such an application is not available in the prior art.

SUMMARY OF THE INVENTION

The present invention has an object to provide a novel powder of composite fine particles consisting of yttria and alumina of which each particle is formed from a core particle of alumina and a cladding layer of yttria covering the core particle to provide a microscopically much higher intimacy and uniformity in the mixing condition of these two component oxides than in the conventional sintered body of a yttria/alumina powder blend so as to be used as a substitute for alumina powders in the protective coating film of fluorescent lamps.

Thus, the present invention provides composite particles of yttria and alumina of which each particle has a composite structure consisting of a core particle of alumina and a cladding layer of yttria on the core particle. In particular, the core particles of alumina should be so fine that the specific surface area thereof is at least 20 $m^2/g$ and the relative amount of yttria in the composite particles is in the range from 1% to 99% by weight, the balance being alumina.

The above defined composite particles of yttria and alumina can be prepared by the method according to the invention which comprises the steps of:

(a) dispersing particles of alumina in an aqueous solution of a water-soluble inorganic salt of yttrium to form an aqueous suspension;

(b) dissolving urea in the aqueous suspension;

(c) heating the aqueous suspension of the aluminum oxide particles containing urea at a temperature of 80° C., or higher to form a cladding layer of a basic carbonate of yttrium on the particles of alumina;

(d) collecting the suspended particles by separation from the aqueous medium; and (e) calcining the particles separated from the aqueous medium in an atmosphere of an oxidizing gas at a temperature in the range from 660° C. to 1300° C.

DETAILED DESCRIPTION OF THE PREFERRED EMBODIMENTS

As is described above, the composite particles of yttria and alumina each have a unique composite structure of a core of alumina and cladding layer of yttria. The composite particles can be prepared by the above described method comprising the steps (a) to (e).

In step (a) of the inventive method, particles of alumina, which should preferably be so fine that the specific surface area determined by the BET method is at least 20 $m^2/g$, are dispersed in an aqueous solution containing a water-soluble salt of yttrium, such as yttrium nitrate, yttrium chloride and yttrium sulfate, of which yttrium nitrate is preferred, to form an aqueous suspension of the alumina particles. The amount of alumina particles, which serve as the core of the composite particles, added to the aqueous solution is preferably in the range from 1.0 to 350 g/liter. The concentration of the water-soluble salt of yttrium in the aqueous solution should be in the range from 0.03 to 3.0 moles/liter or, preferably, from 0.03 to 1.0 mole/liter and the total amount of the yttrium salt is in the range from $8.9 \times 10^{-5}$ to 0.89 mole calculated as yttrium ions per g of the alumina particles though widely depending on the desired yttria:alumina weight proportion which is in the range from 1:99 to 99:1.

In step (b) of the inventive method, urea is dissolved in the above obtained suspension of alumina particles in an aqueous medium containing the water-soluble yttrium salt. The amount of urea added to the aqueous suspension should be in the range from 3 to 100 moles or, preferably, from 8 to 30 moles per mole of the yttrium ions contained therein. When the amount of urea dissolved in the aqueous suspension is too small, precipitation of the yttrium ions in the form of a basic carbonate cannot be complete or takes an unduly long time while, when the amount of urea is increased to exceed the above mentioned upper limit, no additional advantages are obtained thereby rather with an economical disadvantage due to the unutilized amount of the urea.

In step (c) of the inventive method, the suspension of alumina particles dispersed in an aqueous medium containing the water-soluble yttrium salt and urea dissolved therein is heated under agitation at an elevated temperature, for example, in the range from 80° C., to the boiling point of the aqueous medium so that the urea is gradually hydrolyzed into ammonia and carbon dioxide which react with the yttrium ions to form a basic carbonate of yttrium to be deposited on the surface of the alumina particles forming a cladding layer on the core particles. When the heating temperature of the aqueous suspension is too low, the rate of the hydrolysis reaction of urea is unduly low so that an impracticably long time is taken for completion of the hydrolysis reaction. In particular, almost no hydrolysis reaction of urea can proceed at a temperature of 70° C. or lower. When the aqueous suspension is kept at a temperature in the above mentioned range under agitation, the hydrolysis reaction of urea is usually complete within a time of 60 minutes to 300 minutes.

In step (d) of the inventive method, the particles, each of which has a composite structure consisting of a core particle of alumina and a cladding layer of a basic carbonate of yttrium, suspended in the aqueous medium are collected by a suitable solid-liquid separation method known in the prior art such as decantation, filtration by using a filter press, centrifugal separation and others to be separated from the aqueous medium. If necessary, the composite particles separated from the aqueous medium are washed with water to be freed from any electrolytes although washing of the particles with water is usually not necessary when the water-soluble yttrium salt as the starting material is yttrium nitrate because nitrate ions adsorbed on the particles are completely decomposed in the subsequent calcination treatment in step (e) leaving no impurities.

Lastly in step (e), the composite particles of alumina and a basic carbonate of yttrium obtained in step (d) are dried and subjected to a calcination treatment at a temperature in the range from 660° C. to 1300° C. or, preferably, from 660° C. to 900° C. in an atmosphere of an oxidizing gas such as atmospheric air so that the basic carbonate of yttrium is thermally decomposed and converted into yttrium oxide which forms a cladding layer of yttria on the core particles of alumina. The decomposition reaction of the basic carbonate of yttrium is usually complete by conducting the calcination treatment for at least 10 minutes or, preferably, for at least 240 minutes depending on the calcination temperature. When the calcination temperature is too low or the calcination time is too short, thermal decomposition of the basic carbonate would be incomplete so that the content of carbon is increased in the composite particle product obtained by the calcination treatment. The calcination temperature, on the other hand, should not be too high because a phenomenon of sintering of the particles may be caused resulting in coarsening of the composite particles.

It is noted here that precipitation of the basic carbonate of yttrium in step (c) proceeds to deposit the basic carbonate on the surface of the alumina particles as the core and not to form discretely precipitated particles of the basic carbonate in the free liquid phase isolated from the alumina particles. This assumption is supported by the fact that, when precipitation of the basic carbonate of yttrium by the urea method is conducted in the absence of alumina particles, the resultant particles of the basic carbonate of yttrium as precipitated have a relatively large average particle diameter of, for example, 0.2 to 1 µm and the yttria particles prepared by the calcination of the basic carbonate precipitates at 800° C. for 4 hours have a relatively small specific surface area of only 2 to 10 $m^2/g$ while the specific surface area of the composite oxide particles obtained according to the inventive method under the same calcination conditions can be as large as 20 $m^2/g$ or larger depending on the particle size of the starting alumina particles as the core and the amount of the cladding layer of yttria to be clearly distinguishable from a powder blend consisting of discrete particles of alumina and particles of yttria.

In the following, the present invention is described in more detail by way of an example, which, however, never limits the scope of the invention in any way. In the following Example, the specific surface area of the powders was determined by the BET method known in the art in which nitrogen gas was adsorbed on the powder sample after degassing and chilled at the temperature of liquid nitrogen followed by an increase of the temperature to room temperature to measure the volume of the desorbed nitrogen gas, from which the surface area of 1 g of the powder sample was calculated.

EXAMPLE

An aqueous solution in a volume of 1000 liters was prepared by dissolving yttrium nitrate in deionized water to make up a concentration of 0.05 mole/liter. This yttrium nitrate solution was heated and kept at 97° C. and 4300 g of an alumina powder having a specific surface area of 80 $m^2/g$ were introduced into the yttrium nitrate solution and dispersed therein under agitation to form an aqueous suspension of the alumina particles. Further, 48 kg of urea were added to the aqueous suspension and dissolved therein by agitation and the urea-added suspension was kept at 97° C. for 60 minutes under agitation. Thereafter, the urea-added suspension was filtered through a Buchner funnel to collect the suspended particles each of which had a composite structure consisting of a core particle of alumina and a cladding layer of basic carbonate of yttrium.

The wet cake of the particles obtained by filtration was transferred to a sagger of fused silica glass and dried and calcined in air at 800° C. for 4 hours followed by spontaneous cooling to room temperature to obtain 9800 g of a powder product of which each particle had a composite structure consisting of a core particle of alumina and a cladding layer of yttria. The contents of yttria and alumina in this powder as determined by a chemical analysis were 57% by weight of yttria and 43% by weight of alumina. This powder product had a specific surface area of 34 $m^2/g$ and was found to be suitable as the base material of sintered bodies and as an ingredient in protective films on fluorescent lamps.

What is claimed is:

1. Particles of mixed aluminum oxide and yttrium oxide having a specific surface area of at least 20 $m^2/g$ and of which each particle has a composite structure consisting of a core particle of aluminum oxide and a cladding layer of yttrium oxide on the core particle, the weight proportion of aluminum oxide and yttrium oxide being in the range from 1:99 to 99:1.

* * * * *